(12) United States Patent
Krishnan et al.

(10) Patent No.: US 9,302,719 B1
(45) Date of Patent: Apr. 5, 2016

(54) INTEGRATED STEPGATE AND HANDLE ASSEMBLY

(71) Applicant: FORD GLOBAL TECHNOLOGIES, LLC, Dearborn, MI (US)

(72) Inventors: Venkatesh Krishnan, Canton, MI (US); Ravikumar Ranganathan, Farmington Hills, MI (US); Brandon Buckhalt, Belleville, MI (US); Thomas M. Herline, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/511,522

(22) Filed: Oct. 10, 2014

(51) Int. Cl.
*B60R 3/00* (2006.01)
*B62D 33/027* (2006.01)
*B60R 3/02* (2006.01)

(52) U.S. Cl.
CPC .............. *B62D 33/0273* (2013.01); *B60R 3/02* (2013.01)

(58) Field of Classification Search
CPC ............................... B62D 33/0273; B60R 3/02
USPC .................................................. 296/57.1, 62
See application file for complete search history.

(56) References Cited

U.S. PATENT DOCUMENTS

| | | | |
|---|---|---|---|
| 5,205,603 A * | 4/1993 | Burdette, Jr. | E06C 5/02 182/195 |
| 7,090,276 B1 | 8/2006 | Bruford et al. | |
| 7,712,811 B2 | 5/2010 | Heaman et al. | |
| 8,613,475 B1 | 12/2013 | Statz | |
| 8,678,457 B1 | 3/2014 | Duderstadt | |
| 2011/0168491 A1 | 7/2011 | Cheatham, Jr. | |
| 2014/0203587 A1 | 7/2014 | Krishnan et al. | |

* cited by examiner

*Primary Examiner* — Joseph D Pape
(74) *Attorney, Agent, or Firm* — Jason Rogers; King & Schickli, PLLC

(57) ABSTRACT

An integrated stepgate and handle assembly includes a tailgate, a displaceable ladder carried on the tailgate, a displaceable handle carried on the tailgate and a latch. The latch connects the ladder and the handle whereby the handle is partially deployed with the ladder. This partial deployment of the handle prompts the operator to fully deploy and use the handle.

20 Claims, 7 Drawing Sheets

US 9,302,719 B1

INTEGRATED STEPGATE AND HANDLE ASSEMBLY

TECHNICAL FIELD

This document relates generally to the motor vehicle field and, more particularly, to an integrated stepgate and handle assembly used for accessing a cargo area of a vehicle.

BACKGROUND

Some vehicles such as station wagons, sport-utility vehicles (SUV), vans, pickup trucks, flatbed trucks, dump trucks and the like, as well as certain kinds of trailers and wagons, have an access gate that is hinged at the bottom that opens to access a cargo area. Typically the door or gate is located at the rear of the vehicle or trailer and is generally referred to as a tailgate.

Published U.S. Patent Application 2014/0203587, owned by Ford Global Technologies, LLC, relates to an integrated step and grab-handle system for tailgates. The integrated ladder and safety handle in this system are deployed independently of one another. This document relates to an improved, integrated stepgate and handle assembly incorporating a mechanism to partially deploy the safety handle as the displaceable ladder is being deployed. Advantageously, this partial deployment prompts the operator to fully deploy and use the safety handle.

SUMMARY

In accordance with the purposes and benefits described herein, an integrated stepgate and handle assembly is provided. That assembly comprises a tailgate, a ladder, a handle and a latch. The ladder is displaceable between a storage position within the tailgate and a use position. The handle is displaceable between a stowed position within the tailgate and a deployed position. The latch connects the ladder and the handle so that the handle is partially deployed as the ladder is displaced into the use position. Advantageously, this partial deployment of the handle serves to prompt the operator to fully deploy the handle and use the handle when climbing the ladder to gain access to the cargo area of the vehicle.

The assembly further includes a first pivot for mounting a first end of the latch to the ladder. A second end of the latch includes a catch and a cam. The handle includes a shaft and a knob. The latch is spring biased into a latching position wherein the catch engages the knob. The ladder includes a u-shaped rail having a first pivot pin at a first end and a second pivot pin at a second end. The ladder further includes a step carried on that rail.

In addition the assembly includes a guide track in the tailgate. The rail is received and held in the guide track when the ladder is in the storage position. In addition the assembly further includes a first receiver and a second receiver on the tailgate. The first pivot pin is received in the first receiver while the second pivot pin is received in the second receiver when the ladder is deployed into an intermediate position between the storage position and the use position. The ladder is connected by the latch to the handle as the ladder translates along and relative to the guide track when displaced between the storage position and the intermediate position. This serves to partially deploy the handle. The ladder is then pivoted about the first and second pivot pins from the intermediate position into the use position thereby releasing the latch from engagement with the handle.

The handle includes a second pivot whereby the handle may be pivoted from the reclined position to an upright position when fully extended from the tailgate. In addition a direction label may be provided on the shaft of the handle where it is prominently displayed when the handle is in the partially deployed position.

The integrated stepgate and handle assembly may be more broadly described as comprising a tailgate, a displaceable ladder carried on the tailgate, a displaceable handle carried on the tailgate, and a latch connecting the ladder and the handle whereby the handle is partially deployed with the ladder. In accordance with an additional aspect, a method is provided for deploying an integrated stepgate and handle assembly including a ladder and handle. That method comprises the steps of: (a) displacing the ladder from a storage position to a use position and (b) temporarily connecting the handle to the ladder whereby the handle is at least partially deployed as the ladder is displaced toward the use position.

In the following description, there are shown and described several preferred embodiments of the integrated stepgate and safety handle assembly. As it should be realized, the assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated stepgate and safety handle assembly and together with the description serve to explain certain principles thereof. In the drawing.

Reference will now be made in detail to the present preferred embodiments of the integrated stepgate and handle assembly, examples of which are illustrated in the accompanying drawing figures.

DETAILED DESCRIPTION

Figure 1:
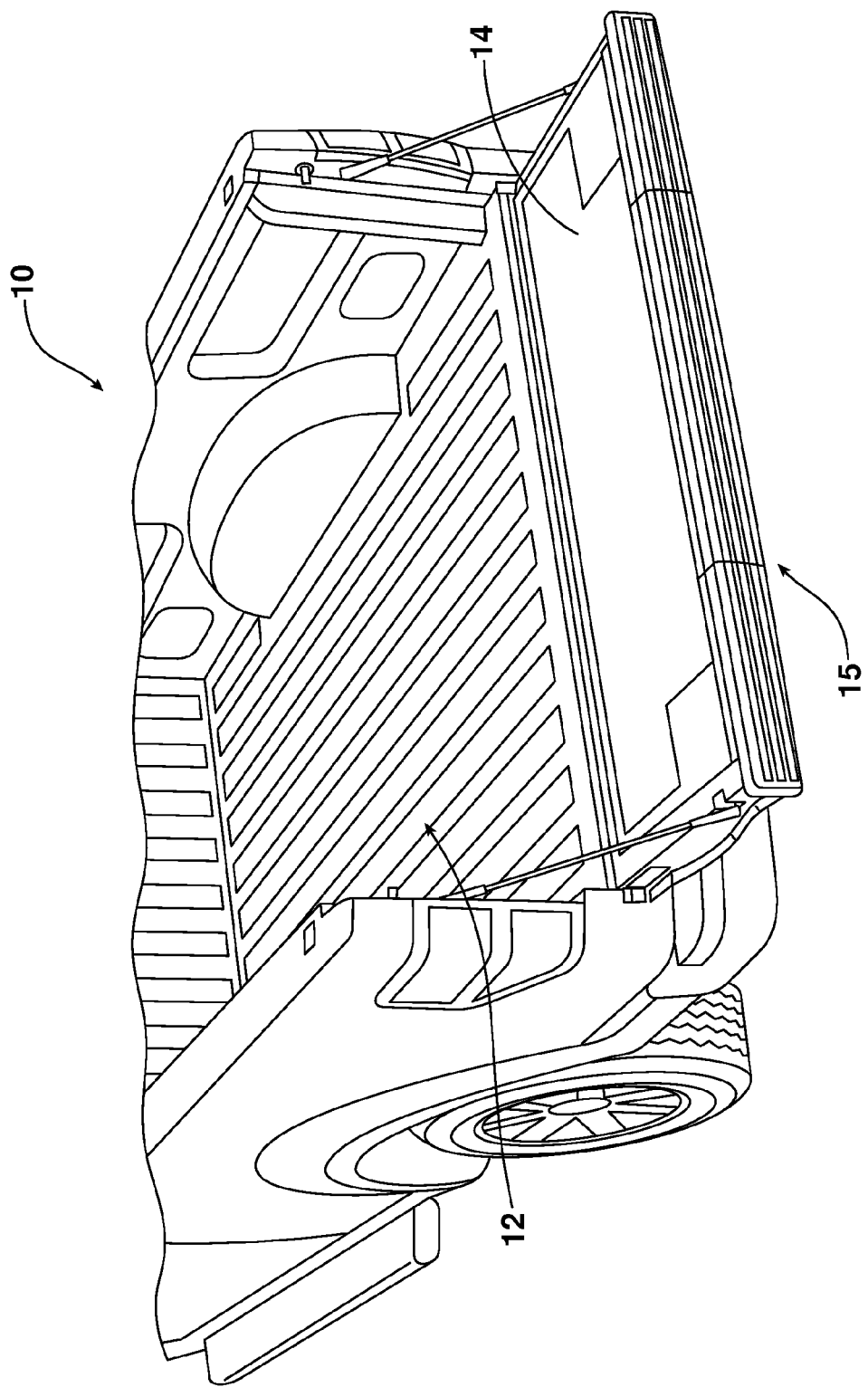
FIG. 1 is a partial rear perspective view of a cargo bed of a vehicle having an open tailgate equipped with an integrated stepgate and handle assembly illustrated in the storage or stowed position.
Figure 2:
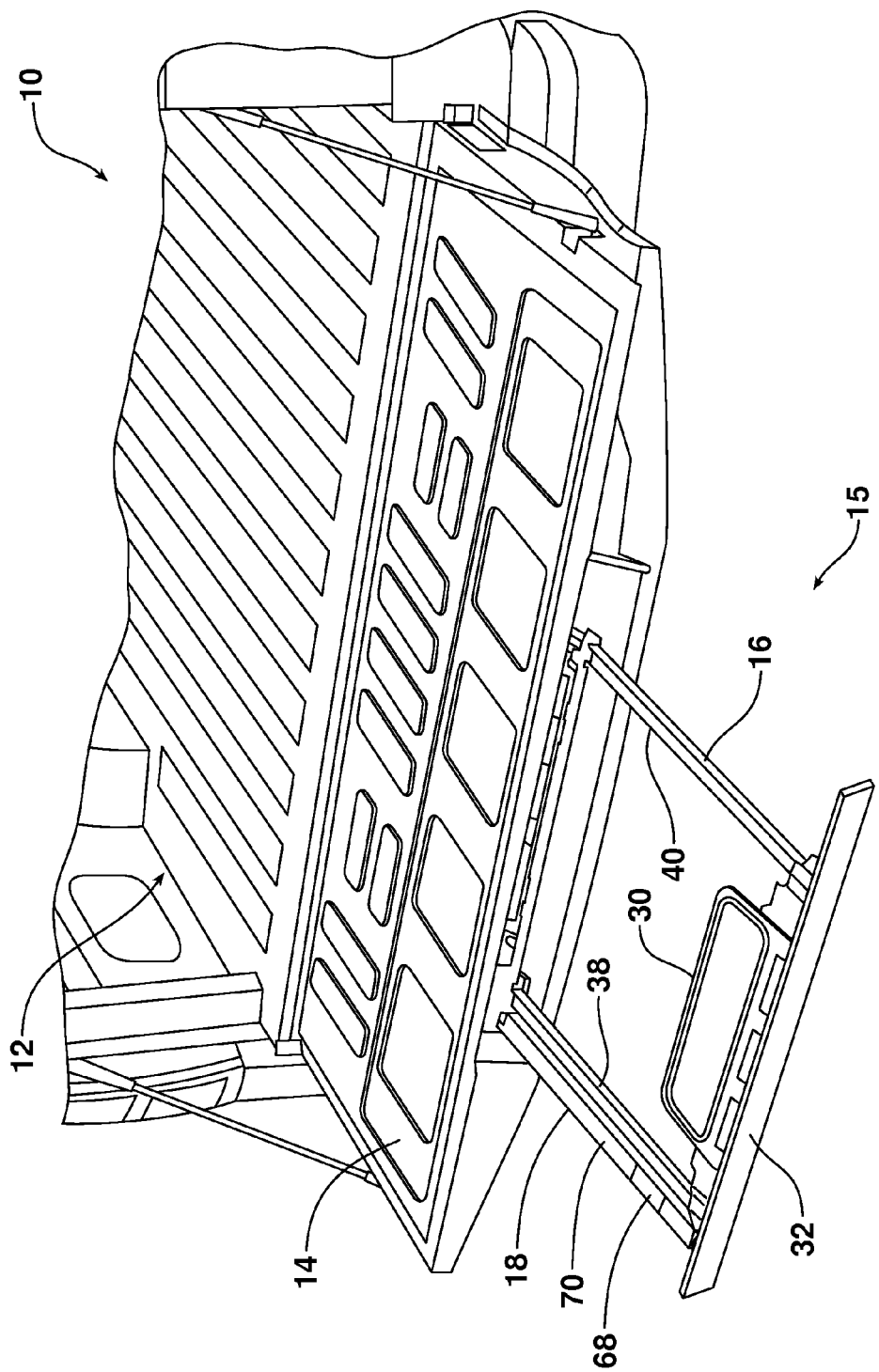
FIG. 2 is a detailed view of the tailgate illustrating the ladder in the intermediate position and the handle in the partially deployed position.
Figure 3:
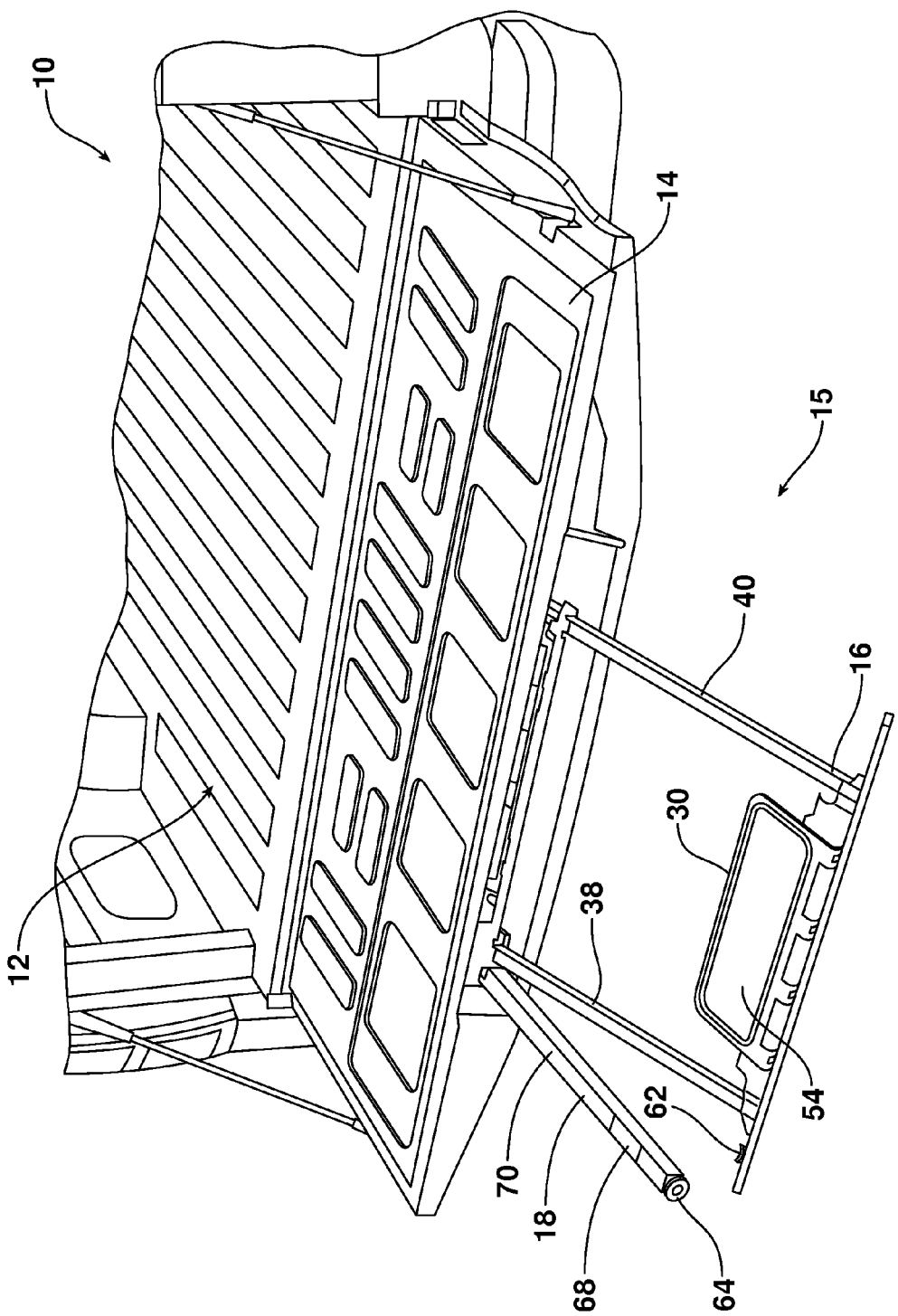
FIG. 3 is a perspective view illustrating the ladder in the use position and the handle in the partially deployed position.
Figure 4:
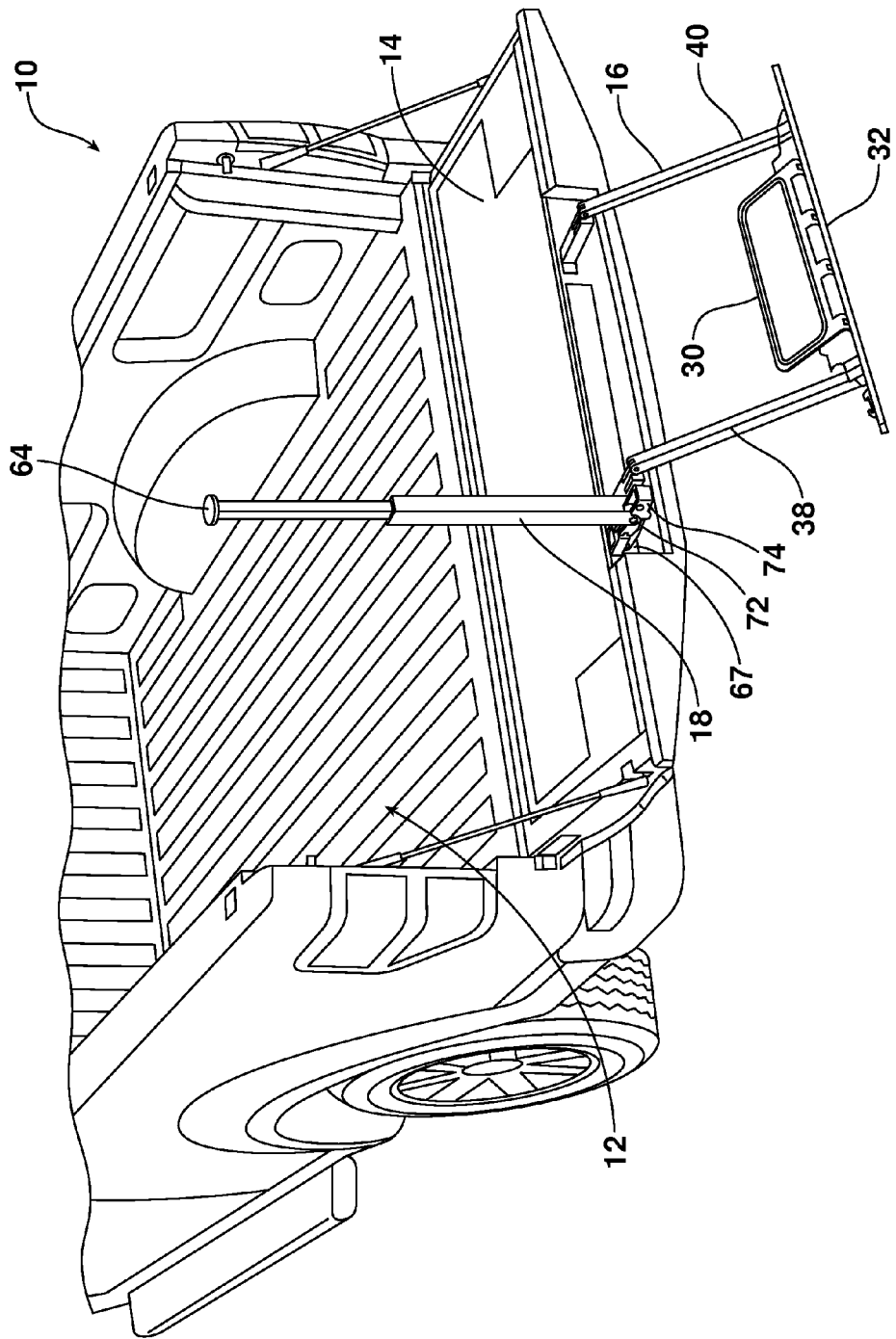
FIG. 4 is a perspective view illustrating the ladder in the use position and the handle in the fully deployed position.

Reference is now made to FIG. 1 which is a partial rear view of a vehicle 10. The vehicle 10 includes a cargo area 12 and an open tailgate 14. The tailgate 14 is equipped with an integrated stepgate and handle assembly, generally designated by reference numeral 15. As should become apparent from viewing FIGS. 2-7, that integrated stepgate and handle assembly 15 includes a displaceable ladder 16 and a displaceable safety handle 18. In FIG. 1, the ladder 16 is in the storage position and the handle 18 is in the stowed position where both are contained out of view within the body of the tailgate 14. In FIG. 2, the ladder is illustrated in the intermediate position and the handle 18 is illustrated in the partially deployed position. In FIG. 3, the ladder 16 is illustrated in the use position while the handle 18 is still illustrated in the partially deployed position. Finally, in FIG. 4, the ladder 16 is illustrated in the use position and the handle 18 is illustrated in the fully deployed position.

Figure 5:
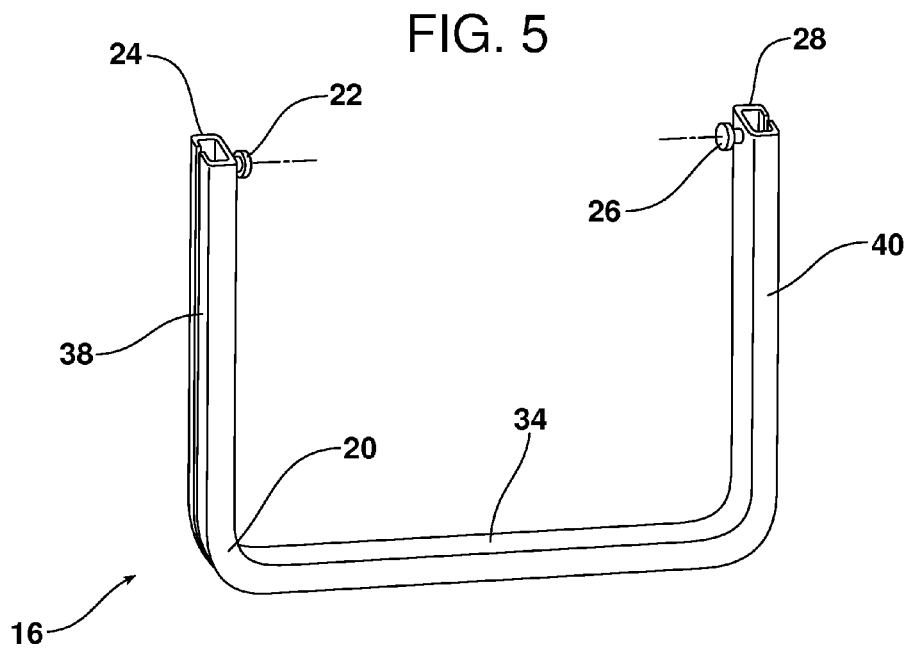
FIG. 5 is a perspective view of a ladder rail and pins.

As illustrated in FIG. 5, the ladder 16 includes a u-shaped rail 20 having a first pivot pin 22 at a first end 24 and a second pivot pin 26 at a second end 28. A step 30 and decorative facia 32 are secured to the intermediate segment 34 of the rail (see FIGS. 2-4).

Figure 6A:
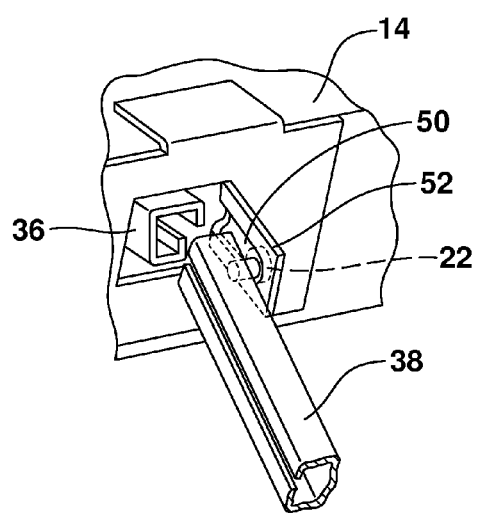
FIG. 6a is a diagrammatic view of a support bracket or receiver which receives a cooperating pivot pin on the ladder to allow the ladder to be pivoted from an intermediate position to a fully deployed, use position.
Figure 6B:
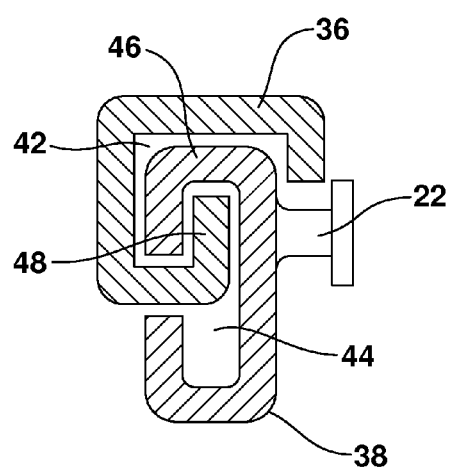
FIG. 6b is a cross-sectional view showing one embodiment of a rail guide supporting a ladder rail.

Reference is now made to FIGS. 6a and 6b illustrating a guide track 36 secured in the tailgate 14 that receives and guides the end segment 38 of the rail 20 as the ladder 16 is displaced from the storage position illustrated in FIG. 1 to the intermediate position illustrated in FIG. 2. As best illustrated in FIG. 6b, the guide track 36 forms an L-shaped slot 42. The end segment 38 includes a cooperating T-shaped channel 44. The upper section or flange 46 of segment 38 is received in the slot 42 while the flange 48 of guide track 36 is received in the T-shaped channel 44. This arrangement allows the segment 38 to freely slide in and out of the guide track 36 so that the ladder 16 may be easily displaced between the storage position of FIG. 1 and the intermediate position of FIG. 2. While not illustrated, the end segment 40 is received in a similar guide track 36 and operates in the same manner.

Once the ladder 16 has been displaced into the intermediate position, the pivot pin 22 engages the end of a slot 50 formed in the first receiver 52 (see FIG. 6a). The second pivot pin 26 engages in a similar slot in a second receiver. As should be further appreciated, the distal end of the end segment 38 is now removed and free of the guide track 36. Accordingly, the ladder 11 may now be pivoted about the axis defined by the two pivot pins 22, 26 from the intermediate position illustrated in FIG. 2 to the use position illustrated in FIG. 7. As should be appreciated, in the use position, the step 30 is oriented with a step face 54 oriented upwardly and at a height for the operator to easily raise his foot to engage that step face.

Figure 7:
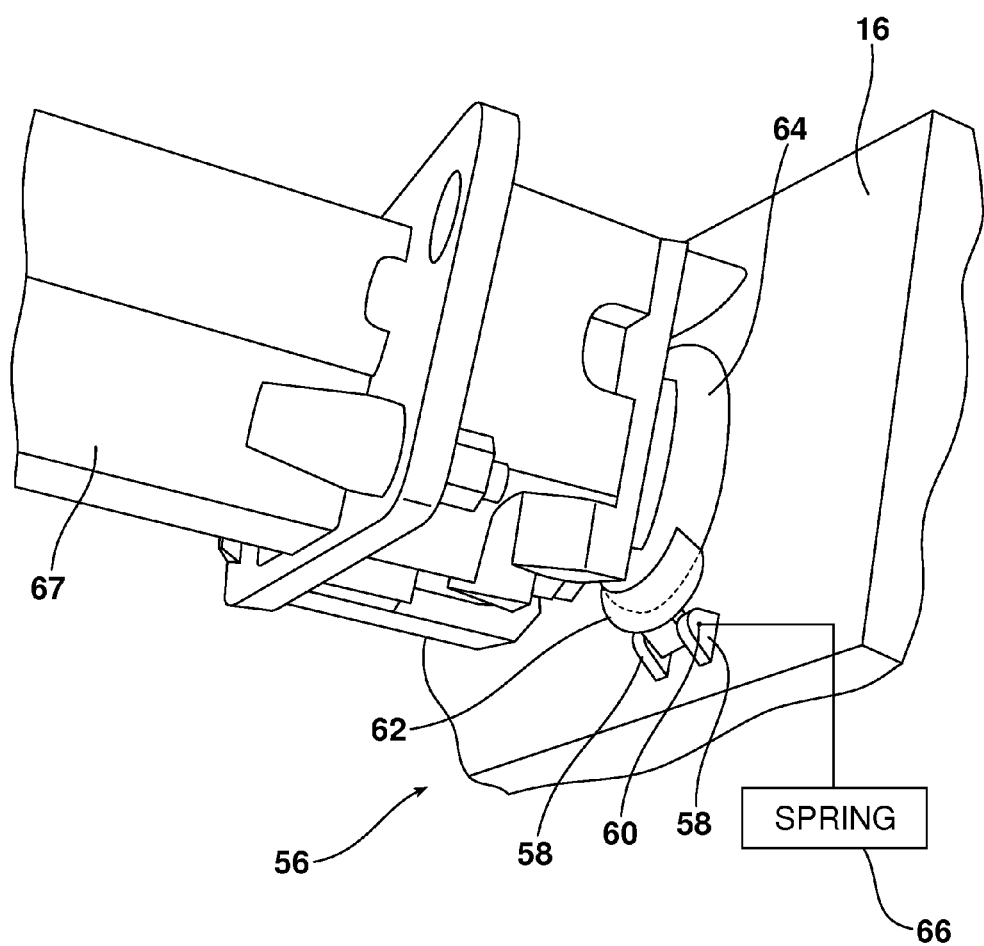
FIG. 7 is a detailed perspective view illustrating the latch mechanism that connects the ladder and the handle so that the handle is partially deployed as the ladder is displaced into the intermediate position.
Figure 8A:
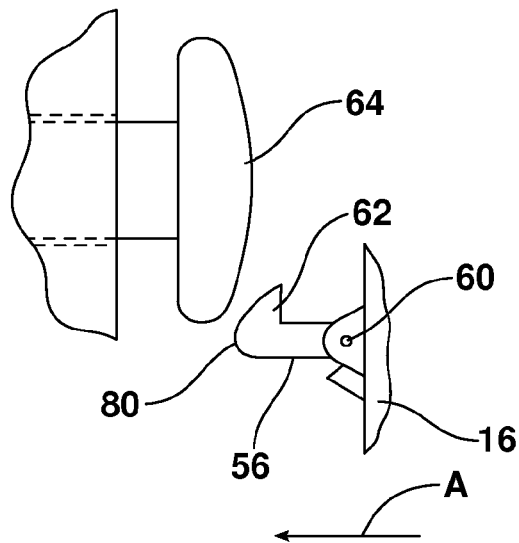
FIGS. 8a-8c are schematic views illustrating how the latch engages the knob of the handle when the ladder is displaced to the home position from the intermediate position.
Figure 8B:
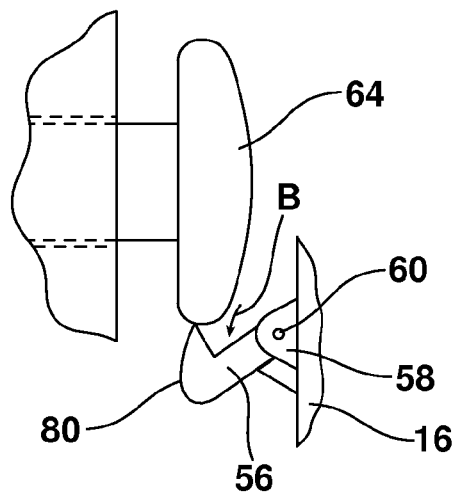
Figure 8C:
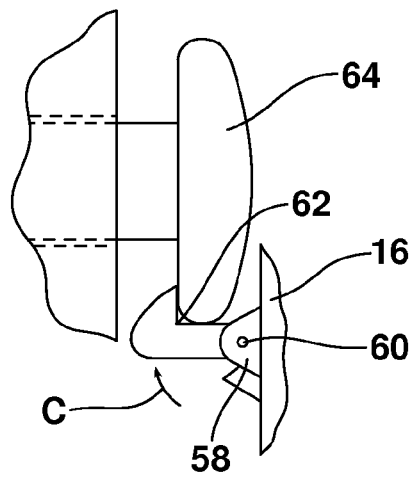

Reference is now made to FIGS. 7 and 8a-8c which illustrates the latch mechanism, generally designated by reference numeral 56, that temporarily connects the ladder 16 with the handle 18 and whereby the handle is partially deployed as the ladder is moved toward the use position. As illustrated in FIG. 7, the latch 56 is pivotally mounted to the ladder 16 at a first end by means of a bracket 58 and pivot pin 60. The opposite or second end of the latch 56 includes a catch 62 that is sized and shaped to engage a knob 64 on the end of the handle 18. A coil spring 66, schematically illustrated in FIG. 7, biases the latch 56 in the direction of action arrow A so that the catch 62 positively engages the knob 64.

As the ladder 16 is moved from the storage position illustrated in FIG. 1 to the intermediate position illustrated in FIG. 2, the catch 62 remains engaged with the knob 64. As a result, the handle 18 is withdrawn from its guide track 67 in the tailgate 14 into a prone, partially deployed position illustrated in FIG. 2. Once the ladder 16 reaches the intermediate position, translational movement along the guide track 36 ends and the ladder 16 is pivoted downwardly about the axis formed by the two pivot pins 22, 26. This pivotal movement of the ladder 16 serves to disengage the catch 62 from the knob 64 on the end of the handle 18. Thus, when the ladder 16 is pivoted into the use position, the handle 18 remains in the prone, partially deployed position as illustrated in FIG. 6. An instruction or direction label 68 may be provided on the shaft 70 of the handle, facing upwardly so as to be fully visible when the handle 18 is in the partially deployed position. This instruction label 68 will inform the operator of how to complete deployment of the handle 18. This is done by further translating the handle 18 horizontally and rearwardly from the tailgate 14 until cooperating pivot pins 72 at the proximal end of the handle are received in the cooperating bracket 74 and the handle may be pivoted into the upright, fully deployed position illustrated in FIG. 7. A locking pin (not shown) secures the handle 18 in this position where it may be easily grasped by the operator as the operator steps onto the ladder and then from the ladder up into the cargo area 12 of the vehicle 10.

After use, the operator releases the lock on the handle 18, pivots the handle downwardly to a prone position and then pushes the handle along a guide track back into the tailgate 14. Next the operator pivots the ladder 16 upwardly from the use position to the intermediate position illustrated in FIG. 2. The ladder 16 is then pushed toward the tailgate (note action arrow A in FIG. 8a) so that the rail 20 is inserted into the tailgate while the end segments 30, 40 of the rail travel on the cooperating guide tracks 36. When the catch 62 comes into contact with the knob 64 (note FIG. 8b), the outer curved cam surface 80 on the catch slides freely across the curved surface of the knob 64. This causes the catch 62 to pivot against the force of the spring 66 about the pivot pin 60 (note action arrow B in FIG. 8b). The downward pivoting action provides the necessary clearance for the catch 62 to slide past the knob until the knob is received in the u-shaped cavity on the back of the catch at which time the biasing spring biases the catch in the direction of action arrow C in FIG. 8c so as to again complete the connection between the ladder 16 and the handle 18 for partial deployment of the handle the next time the ladder is deployed from the tailgate.

As should be appreciated, a method of deploying an integrated stepgate and handle assembly 10 is also provided. That method includes displacing the ladder 16 from a storage position toward a use position and temporarily connecting the handle 18 to the ladder whereby the handle is at least partially deployed as the ladder is displaced toward the use position. Advantageously, the partially deployed handle 18 serves as a prompt to the operator to complete the full deployment of the handle and thereby allowing its use when the operator steps onto the ladder 16 to gain access to the cargo area 12 of the vehicle 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An integrated stepgate and handle assembly, comprising:

a tailgate;

a ladder displaceable between a storage position within said tailgate and a use position;

a handle displaceable between a stowed position within said tailgate and a deployed position; and a latch connecting said ladder and said handle whereby said handle is partially deployed as said ladder is displaced toward said use position; and a first pivot for mounting a first end of said latch to said ladder.

2. The assembly of claim 1, wherein a second end of said latch includes a catch and a cam.

3. The assembly of claim 2, wherein said handle includes a shaft and a knob and said latch is spring biased into a latching position wherein said catch engages said knob.

4. The assembly of claim 3, wherein said ladder includes a u-shaped rail having a first pivot pin at a first end and a second pivot pin at a second end.

5. The assembly of claim 4, wherein said ladder further includes a step carried on said rail.

6. The assembly of claim 4, further including a guide track in said tailgate, said rail being received and held in said guide track when said ladder is in said storage position.

7. The assembly of claim 6, further including a first receiver and a second receiver on said tailgate, said first pivot pin being received in said first receiver and said second pivot pin being received in said second receiver when said ladder is deployed into an intermediate position between said storage position and said use position.

8. The assembly of claim 7, wherein said ladder is connected by said latch to said handle as said ladder translates along and relative to said guide track when displaced between said storage position and said intermediate position thereby partially deploying said handle and said ladder is pivoted about said first and second pivot pins from said intermediate position into said use position thereby releasing said latch from engagement with said handle.

9. The assembly of claim 8, wherein said handle includes a second pivot whereby said handle may be pivoted from a reclined position to an upright position when fully extended from said tailgate.

10. The assembly of claim 9, further including an instruction label on said shaft where it is prominently displayed when said handle is in said partially deployed position.

11. A method of deploying an integrated stepgate and handle assembly including a ladder and a handle, comprising:

displacing said ladder from a storage position in a vehicle tailgate to an intermediate position;

temporarily connecting said ladder to said handle whereby said handle is pulled into a partially deployed position as said ladder is displaced from said storage position to said intermediate position;

displacing said ladder from said intermediate position to a use position; and disconnecting said ladder from said handle as said ladder is displaced from said intermediate position to said use position thereby leaving said handle in said partially deployed position.

12. The method of claim 11, further including displacing said handle into a fully deployed and upright position.

13. The method of claim 12, wherein said ladder is displaced from said storage position to said intermediate position by sliding said ladder out of said tailgate.

14. The method of claim 13, wherein said ladder is displaced from said intermediate position to said use position by pivoting about a first axis.

15. The method of claim 14, wherein said handle is displaced from the partially deployed position to the fully deployed position by first sliding out of said tailgate and then pivoting about a second axis.

16. An integrated stepgate and handle assembly, comprising:

a tailgate;

a ladder displaceable between a storage position within said tailgate and a use position;

a handle displaceable between a stowed position within said tailgate and a deployed position; and a latch connecting said ladder and said handle whereby said handle is partially deployed as said ladder is displaced toward said use position, wherein a second end of said latch includes a catch and a cam.

17. The assembly of claim 16, wherein said handle includes a shaft and a knob and said latch is spring biased into a latching position wherein said catch engages said knob.

18. The assembly of claim 17, wherein said ladder includes a u-shaped rail having a first pivot pin at a first end and a second pivot pin at a second end.

19. The assembly of claim 18, wherein said ladder further includes a step carried on said rail.

20. The assembly of claim 19, further including a guide track in said tailgate, said rail being received and held in said guide track when said ladder is in said storage position.

* * * * *